United States Patent [19]

Chang

[11] Patent Number: 5,141,476
[45] Date of Patent: Aug. 25, 1992

[54] TWO-WAY-DRIVEN 3-SPEED FREE WHEEL

[75] Inventor: Dianlin Chang, Shenyang, China

[73] Assignee: S. W. Lam, Hong Kong

[21] Appl. No.: 726,206

[22] Filed: Jul. 5, 1991

[30] Foreign Application Priority Data

Jul. 10, 1990 [CN] China .................. 90 1 05171.3

[51] Int. Cl.⁵ .............................................. F16H 3/44
[52] U.S. Cl. ..................................... 475/297; 475/318; 475/320
[58] Field of Search ................ 280/236; 475/296, 297, 475/317, 318, 320

[56] References Cited

U.S. PATENT DOCUMENTS

| | | | |
|---|---|---|---|
| 4,240,533 | 12/1980 | Fukui | 475/297 X |
| 4,628,769 | 12/1986 | Nagano | 475/297 |
| 4,727,965 | 3/1988 | Zach et al. | 475/297 X |

*Primary Examiner*—Dirk Wright
*Attorney, Agent, or Firm*—Antonelli, Terry, Stout & Kraus

[57] ABSTRACT

Disclosed is a two-way-driven 3-speed free wheel which provides a multi-gear-changing mechanism for use with various kinds of pedal cycles. The disclosed device has four kinds of catches: pawl, hook-pawl, backward pawl and forward pawl. The backward and forward pawls respectively are hinged on the opposed sides of a sprocket wheel by small spindles mounted on the opposed sides of the sprocket wheel. On one side of the sprocket wheel are the backward pawls and an outer ring; on the other side are forward pawls, a ratchet cone and a bearing collar. Between the outer ring and a central gear are two or more planet pinions. As compared with prior art structures, this invention has the following advantages: the structure is simple, the cost is lower, and it is facile to operate and to change speed. Also disclosed are one-way-driven 2-speed free wheels and two-way-driven 2-speed free wheels, using two or three kinds of catches, of the above-described four kinds of catches.

18 Claims, 4 Drawing Sheets

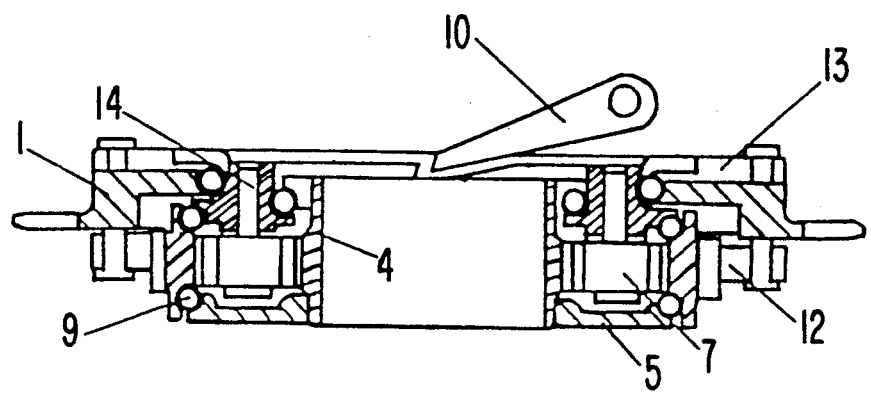
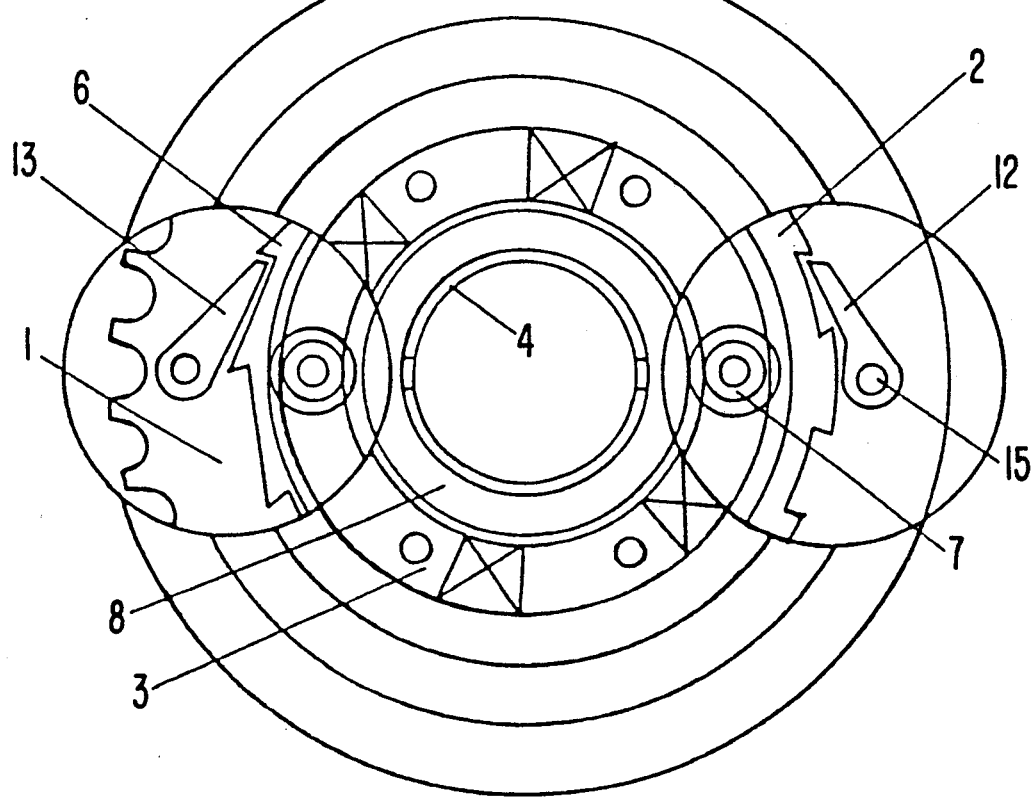

TWO-WAY-DRIVEN 3-SPEED FREE WHEEL

BACKGROUND OF THE INVENTION

1. Field of the Invention

This invention relates to a multi-gear changing mechanism for use with various kinds of bicycle pedals. It is, in specific terms, a 3-speed free wheel operated by forward or backward pedalling.

2. Description of the Prior Art

The ordinary free wheel on a bicycle pedal is for effecting motion only. To achieve gear change there must be a mechanism, which is in most cases composed of a set of coaxial sprocket wheels or a free wheel combined with sprocket wheels. It's a complicated device of relatively high cost and requires the user exercise care while shifting gears. A little negligence might damage the chain or gear teeth. Besides, its transmission power is low and wears out soon.

Previously, the inventor of this invention had designed a two-way-driven 2-speed free wheel (New utility model patent NO. 8520575, Chinese Patent Office) which is capable of gear-changing as well as motion transmission. It is composed of a sprocket wheel, a central gear, catches, cones, etc. It is characterized in that the sprocket wheel has sprockets on the outer edge and gear teeth on the inner edge. Between the sprocket wheel and central gear there are two or more planet pinions fixed on a planet pinion bearing collar and engaging with the central gear and the inner teeth of the sprocket wheel. A catch, hinged on the bottom forks of a bicycle (hereafter referred to as an outer catch), has its tapered end fitted into the ratchet teeth on the side of the planet pinion bearing collar or into outer ratchet teeth on an outer ring. There are also two or more self-locking catches built in the free wheel with their tapered ends fitting into the inner teeth of the sprocket wheel (hereafter referred to as inner catches).

When the sprocket wheel rotates clockwise (in forward direction), the free wheel is in low gear, and when it rotates counterclockwise the free wheel is in high gear. When the sprocket wheel of the free wheel rotates counterclockwise, it will have the inner catches move with the same speed and in the same direction as it. As these catches are fixed on the planet pinion bearing collars, it will rotate, together with the planet pinions attached to it, with the same speed and in the same direction as the sprocket wheel. And the central gear, driven by the planet pinions, will also rotate with the same speed and in the same direction as the sprocket wheel. As this free wheel has a bigger circumference than an ordinary free wheel, the bicycle installed with such a free wheel has, under such condition, a lower speed than one installed with an ordinary free wheel, if their chain wheels rotate with the same speed.

If the chain wheel is back-pedalled, the sprocket wheel of the free wheel will rotate in the same direction and the inner catches will not be interlocked with the planet pinions and the planet pinion bearings. In this case, the planet pinions, engaged with the inner teeth of the sprocket wheel, as well as the planet pinion bearings, are being pushed to rotate with it in a backward direction. But the planet pinion bearing collar is stopped by the catch hinged on the bottom forks, so the planet pinions can only turn to drive the central gear in a forward direction. Thus, the back-pedalling of the chain wheel causes the bicycle to go forward as usual, but in a higher speed.

That device has a variation model, one-way-drive 2-speed free wheel. Its structure is a little different. The sprocket wheel has no inner teeth, while an outer ring has. Each of them can rotate independently of the other. The outer ring has outer ratchet teeth on its outer edge, to be locked by the outer catch. And the sprocket wheel is fastened with the planet bearing collar by a screw thread fitting.

When the outer ring is locked by the outer catch, the forward rotation of the sprocket wheel is to drive the planet pinion bearing collar to rotate in a forward direction. But since the outer ring is locked, the planet pinions can only rotate in a backward direction and drive the central gear to rotate in a forward direction. Under such condition the bicycle runs in high gear.

If the outer catch is disengaged from the ratchet teeth on the outer ring, the planet pinion bearing is to rotate in a forward direction with the forward rotation of the sprocket wheel and cause the outer ring to rotate in a backward direction. But since the inner teeth of the outer ring are locked with the inner catches, the planet pinions keep from turning. Under such condition the central gear rotates with the sprocket wheel at the same speed and the bicycle runs in low gear.

Both of the above-mentioned structures are simpler than the prevailing built-in gear-changing mechanism or the outer one. Compact in form, they are secure and withstand wear and tear. Each can easily be installed on an ordinary pedal cycle. Besides, each can be installed on a fitness bike.

The only shortcoming is the inner catches, which are susceptible to damage under great stress when they are locked.

SUMMARY OF THE INVENTION

This invention is meant to improve on these two structures by overcoming their shortcoming and combining the two into a new model: a two-way-drive-3-speed free wheel.

Firstly, in this new design, the inner catches are replaced by two pairs of pawls hinged on the sprocket wheel to control the direction of motion transmission. Since they are placed externally, they are bigger in size and, consequently, stronger and tougher.

Secondly, the features of the two structures are incorporated into the new one. A symmetric sprocket wheel is replaced by an asymmetric one. The inner teeth of the sprocket wheel are dispensed with. The inner teeth of the sprocket wheel are replaced by the inner teeth of the outer ring to mesh with the planet pinions. The outer edge of the outer ring has double ratchet gullets so that it can be installed the other way round for longer life when the ratchet teeth are worn.

There is added a ratchet cone to regulate the gap of the ball race of the sprocket wheel and drive the bearing collar. The outer edge of the ratchet cone has ratchet teeth. It can impart clockwise motion when it is locked with the pawls. When the ratchet teeth on the outer ring are locked with the pawls, they can impart counter clockwise motion. So the central gear always rotates clockwise, no matter how the sprocket wheel turns.

BRIEF DESCRIPTION OF THE DRAWINGS

FIGS. 3a and 3b are structural drawings of a two-way-driven 2-speed free wheel according to the present invention.

DETAILED DESCRIPTION OF THE INVENTION

Figure 1B:
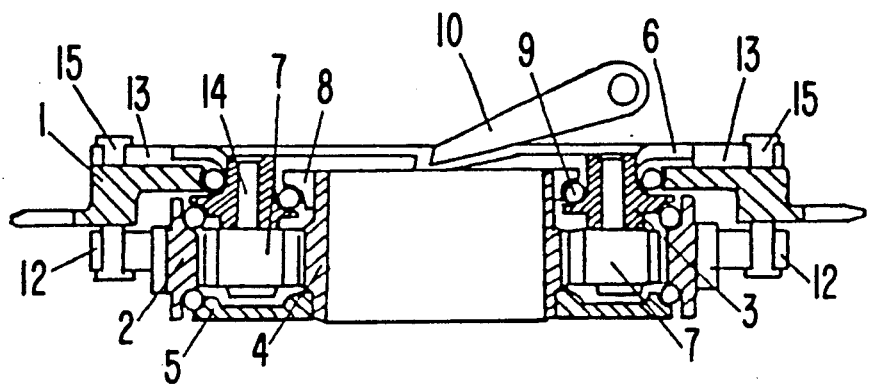
FIGS. 1a and 1b are structural drawings of the two-way-driven 3-speed free wheel according to the present invention.
Figure 1A:
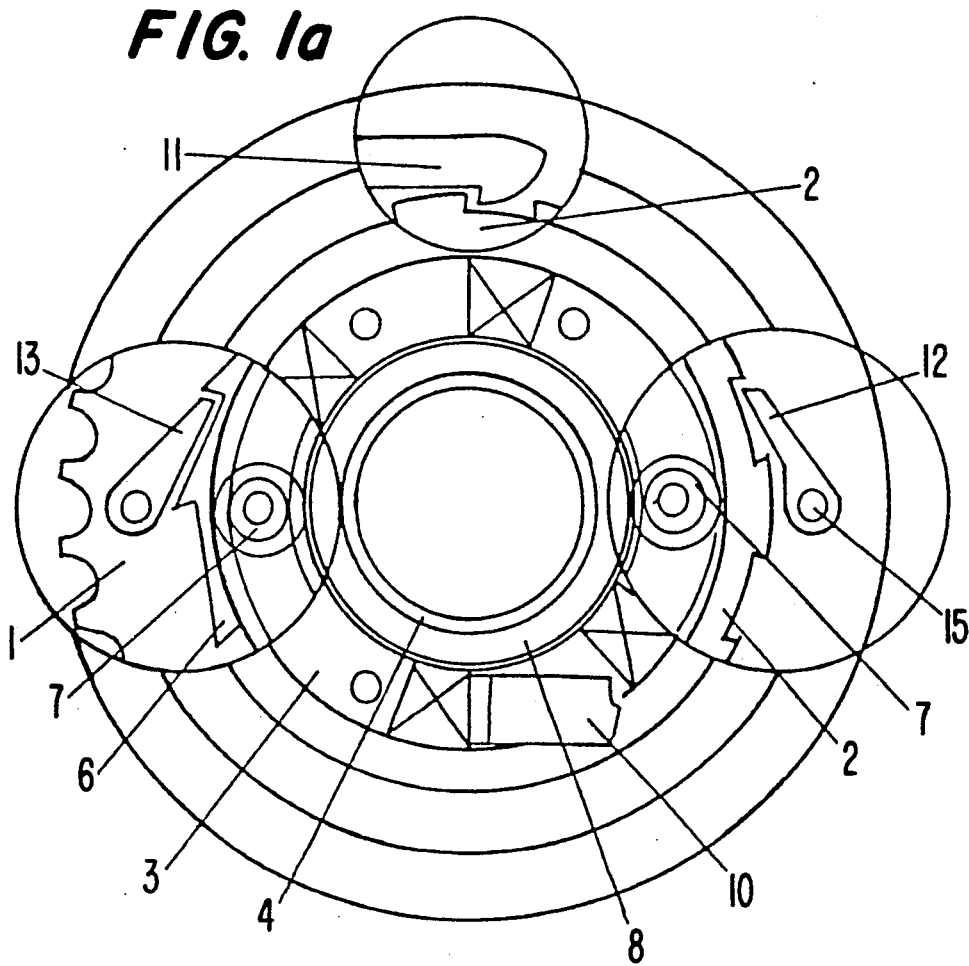

The present invention, in specific embodiments, is described in connection with the accompanying drawing figures. In these drawing figures, reference character 1 represents a sprocket wheel. This sprocket wheel has sprocket teeth on the outer edge, and a ball race on the inner edge. Reference character 2 represents an outer ring, having a ratchet gullet on its outer edge and internal toothing on its inner edge. Reference character 3 is a bearing collar, and as shown is a self-aligning bearing with internal and external ball races. Reference character 4 denotes a central gear, with an internal screw thread. Reference characters 5 and 6 respectively represent cones (bearings) and a ratchet cone (the ratchet cone having ratchet teeth on its outer edge). Reference character 7 represents planet pinions; two or more are used. Reference character 8 denotes screwed cones, and reference character 9 represents balls (4 sets).

Reference character 10 denotes a pawl, and reference character 11 represents a hook pawl. Reference characters 12 and 13 respectively represent backward pawls and forward pawls. Reference character 14 represents planetary spindles (supporting spindles), and reference character 15 represents small spindles (for the pawls).

This invention, as shown in the drawing figures, is composed of a sprocket wheel, an outer ring, a central gear, a bearing collar, screwed cones, pawls and planet pinions. It is characterized in that there are four kinds of catches: pawl 10, hook-pawl 11, backward pawls 12, and forward pawls 13. Pawls 12 and 13 are hinged on both sides of the sprocket wheel by small spindles 15. On one side are backward pawls 12 and outer ring 2. On the other side are forward pawls 13, ratchet cone 6 and bearing collar 3. Between outer ring 2 and central gear 4 are two or more planet pinions 7.

The inner catches (of the previous model) have been dispensed with to avoid problems caused by their inadequate strength as well as to make the structure simpler. Outer ring 2 has a double ratchet gullet on the outer edge for pawls 12 to engage with and thus get locked. Ratchet cone 6 has ratchet teeth on the outer edge for pawls 13 to engage with and thus get locked. The tapered end of pawl 10 fits into the ratchet teeth on the side of bearing collar 3 so as to lock it. The hooked end of hook-pawl 11 fits into the ratchet gullet of outer ring 2 so as to lock it. Both pawls 10 and 11 are hinged on the bottom forks of a bicycle (see, e.g., FIG. 4).

The planet pinions and some other parts of this invention have the same structure as those on the two-way-driven 2-speed free wheel which is the prior art designed by the same inventor.

The operations of the mechanism of this invention, the two-way-driven 3-speed free wheel, are as follows:

1. Low gear operation

Through manipulation, disengage pawl 11 from the ratchet gullet of outer ring 2. Sprocket wheel 1 is driven by the chain to rotate clockwise. By the action of forward pawl 13 on ratchet cone 6, bearing collar 3 rotates clockwise accordingly. Owing to the interlocking of planet pinions 7 with backward pawl 12, central gear 4 is made to turn clockwise. Sprocket wheel 1 and central gear 4 rotate in synchronization to effect low gear operation.

2. Back-pedalling, middle gear operation

Disengage pawl 11 from the ratchet gullet of outer ring 2. Sprocket wheel 1 rotates, counterclockwise when the chain wheel is backpedalled. Backward pawl 12 pushes outer ring 2 to turn counterclockwise. As pawl 10 stops the bearing collar from rotating, the outer ring pushes central gear 4 to rotate clockwise, through planet pinions 7. The speed of rotation of central gear 4 is greater than that of outer ring 2, so back-pedalling, middle gear operation is effected.

3. Forward-pedalling, high gear operation

During the operation, outer ring 2 is locked by pawl 11. When sprocket wheel 1 rotates clockwise, bearing collar 3 rotates with it under the action of forward pawl 13, unhindered by pawls 12 and 10. As outer ring 2 is kept from turning, bearing collar 3 through counter-clockwise rotation of planet pinions 7 drives central gear 4 to rotate clockwise. The speed of rotation of central gear 4 is still greater than that of outer ring 2 and is augmented by the orbital revolution of planet pinions 7. High gear operation is thus effected.

4. Coasting

When the bicycle is coasting along, the sprocket wheel 1 keeps from turning, but central gear 4 keeps turning clockwise and further sets the bearing collar turning clockwise through planet pinions 7. Pawls 10, 12 & 13 do not catch and prevent the bicycle from coasting.

This invention can be adapted to practical needs for two simplified models of a 2-speed free wheel:

1. One-way-driven (forward pedalling) 2-speed free wheel—this model is different from the 3-speed model in the following ways:

(1) Bearing collar 3 has no ratchet teeth and ratchet cone 6 is dispensed with.

(2) No pawls 10 and 13.

Figure 2B:
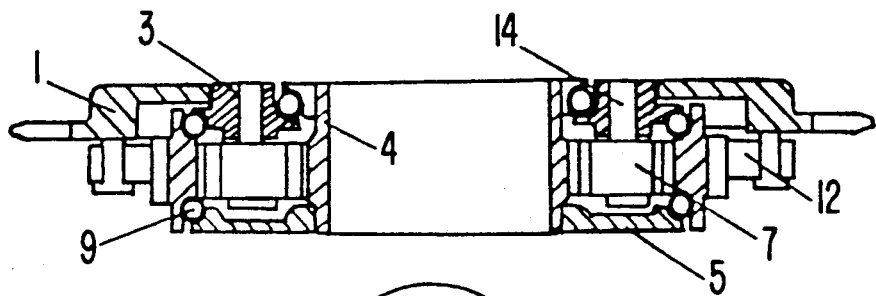
FIGS. 2a and 2b are structural drawings of a one-way-driven (forward pedalling) 2-speed free wheel according to the present invention.
Figure 2A:
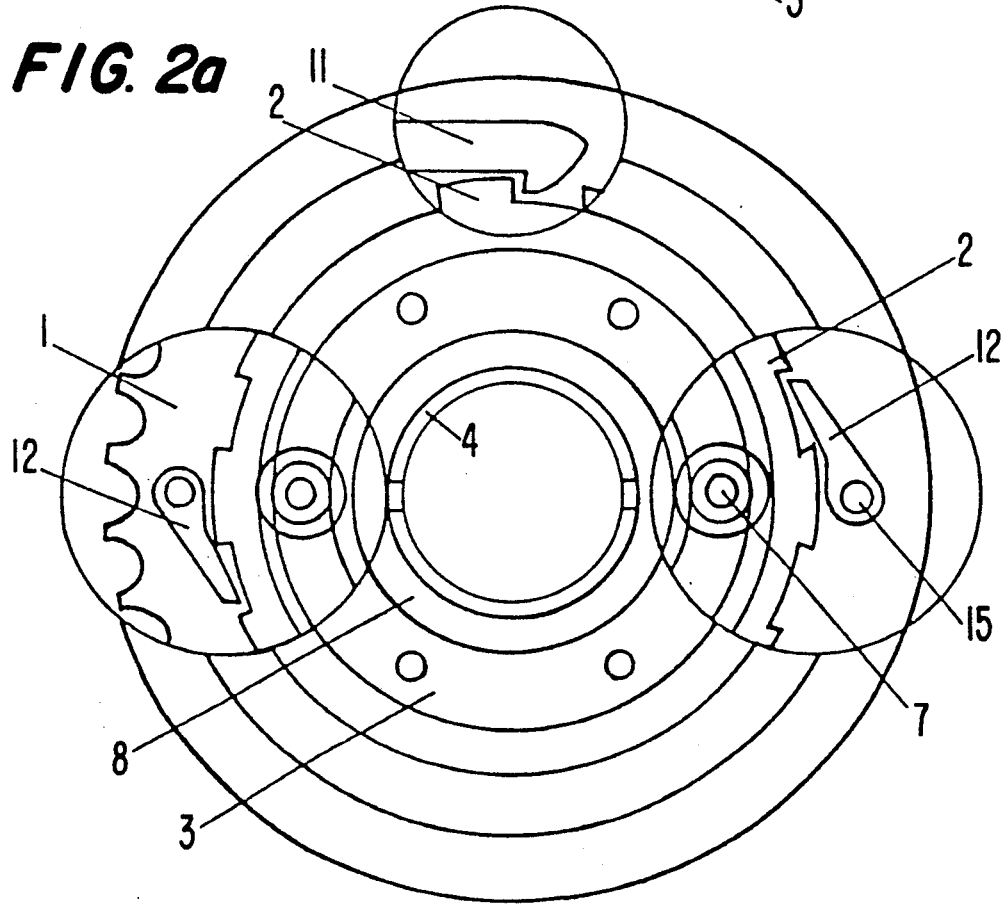

(3) Sprocket wheel 1 and bearing collar 3 are fastened together by screw thread fitting or riveting. FIGS. 2a and 2b are structural drawings of this model.

2. Two-way driven 2-speed free wheel—Forward pedalling for low gear and back-pedalling for high gear. This model has no hook-pawl and its operating lever as the 3-speed mechanism. FIGS. 3a and 3b are structural drawings of this model.

Figure 4:
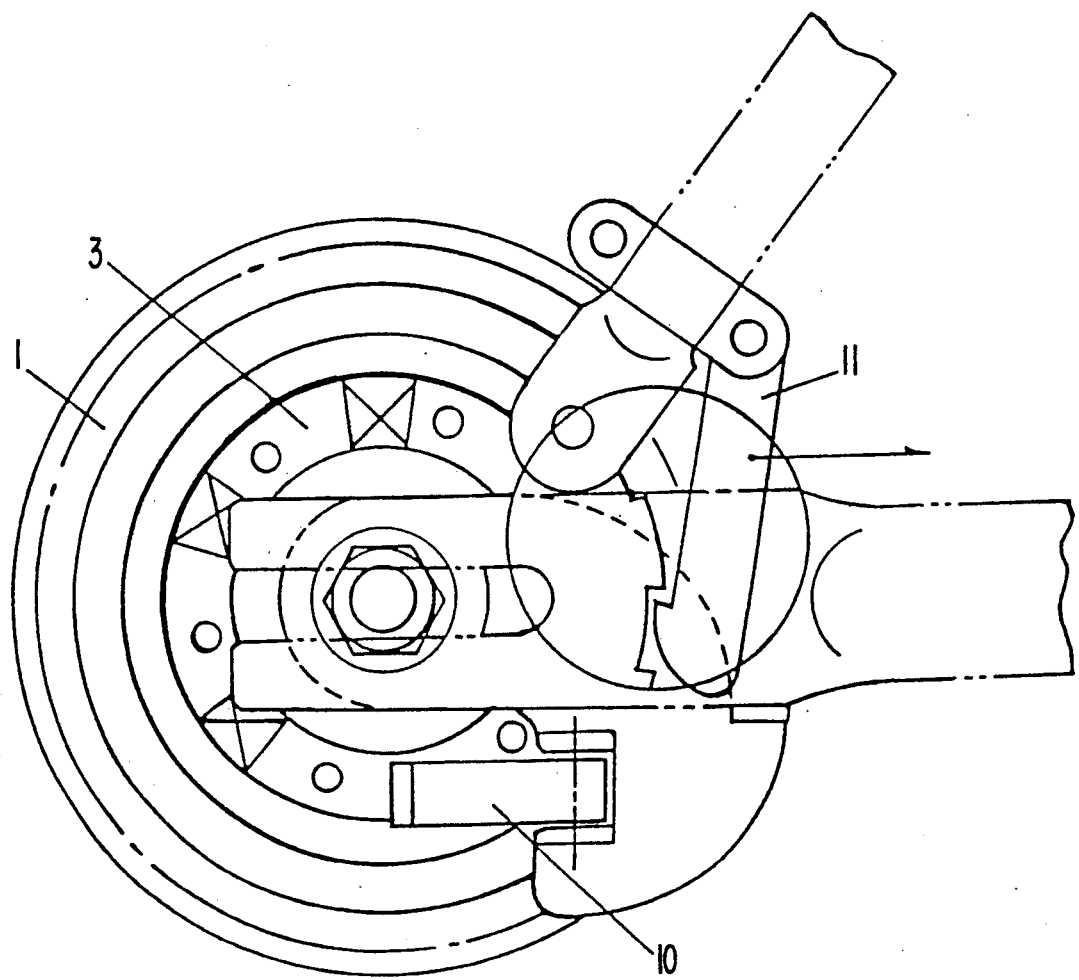
FIG. 4 is an assembly drawing in which a two-way-driven 3-speed free wheel has been assembled on a bicycle.

FIG. 4 is the assembly diagram in which a two-way-driven 3-speed free wheel has been assembled on a bicycle.

What is claimed:

1. A two-way-driven 3-speed free wheel, comprising:
   a sprocket wheel, having first and second opposed sides;
   an outer ring adjacent one of the first and second opposed sides of the sprocket wheel;

backward pawls adapted to engage with the outer ring so as to lock up the outer ring;

a bearing collar adjacent the other of the first and second opposed sides of the sprocket wheel;

a ratchet cone on the other of the first and second opposed sides of the sprocket wheel;

forward pawls adapted to engage with said ratchet cone so as to lock up said ratchet cone;

a bearing collar pawl adapted to engage with the bearing collar so as to lock up the bearing collar;

a hook pawl adapted to engage with the outer ring so as to lock up the outer ring;

a central gear disposed within the outer ring and bearing collar, such that both the outer ring and bearing collar encircle the central gear; and at least two planet pinions disposed between the outer ring and the central gear.

2. A two-way-driven 3-speed free wheel according to claim 1, further comprising spindles respectively mounted on the first and second opposed sides of the sprocket wheel, the forward and backward pawls being provided respectively on said spindles so as to be hinged on respective sides of the sprocket wheel.

3. A two-way-driven 3-speed free wheel according to claim 1, wherein said outer ring has ratchet gullets, the backward pawls being adapted to engage the ratchet gullets of the outer ring so as to lock up the outer ring.

4. A two-way-driven 3-speed free wheel according to claim 3, wherein said ratchet cone has ratchet teeth on an outer edge thereof, the forward pawls being adapted to engage the ratchet teeth of the ratchet cone so as to lock up the ratchet cone.

5. A two-way-driven 3-speed free wheel according to claim 1, wherein an outer edge of the outer ring has ratchet gullets, and wherein said hook pawl is adapted to engage the ratchet gullets of the outer edge of the outer ring so as to lock up the outer ring.

6. A two-way-driven 3-speed free wheel according to claim 5, wherein said hook pawl is tapered, with a tapered end thereof adapted to fit into the ratchet gullets of the outer edge of the outer ring, and wherein the hook pawl is hinged on bottom forks of a bicycle.

7. A two-way-driven 3-speed free wheel according to claim 5, wherein the ratchet gullets of the outer edge are double ratchet gullets.

8. A two-way-driven 3-speed free wheel according to claim 1, wherein an inner edge of the outer ring has inner teeth to mesh with the at least two planet pinions.

9. A two-way-driven 3-speed free wheel according to claim 1, wherein the bearing collar has ratchet teeth on an exposed side thereof, and the bearing collar pawl is adapted to engage the ratchet teeth on the exposed side of the bearing collar, so as to lock up the bearing collar.

10. A two-way-driven 3-speed free wheel according to claim 1, wherein both the hook pawl and the bearing collar pawl are hinged on bottom forks of a bicycle.

11. A one-way-driven 2-speed free wheel, comprising:

a sprocket wheel, having first and second opposed sides;

an outer ring adjacent one of the first and second opposed sides of the sprocket wheel, the outer ring having a ratchet gullet to be engaged by pawls so as to lock up the outer ring;

backward pawls adapted to engage with the outer ring so as to lock up the outer ring;

a bearing collar adjacent the other of the first and second opposed sides of the sprocket wheel;

a hook pawl adapted to engage with the outer ring so as to lock up the outer ring;

a central gear disposed within the outer ring and bearing collar, such that the outer ring and bearing collar encircle the central gear; and at least two planet pinions disposed between the outer ring and the central gear.

12. A one-way-driven 2-speed free wheel according to claim 11, wherein said backward pawls are hinged on spindles mounted on said one of the first and second opposed sides of the sprocket wheel.

13. A one-way-driven 2-speed free wheel according to claim 12, wherein the hook pawl is hinged on bottom forks of a bicycle.

14. A one-way-driven 2-speed free wheel according to claim 13, wherein the ratchet gullet is provided on an outer edge of the outer ring.

15. A one-way-driven 2-speed free wheel according to claim 11, wherein the bearing collar has no ratchet teeth on an exposed side thereof.

16. A two-way-driven 2-speed free wheel, comprising:

a sprocket wheel, having first and second opposed sides;

an outer ring adjacent one of the first and second opposed sides of the sprocket wheel;

backward pawls adapted to engage with the outer ring so as to lock up the outer ring;

a bearing collar adjacent the other of the first and second opposed sides of the sprocket wheel;

a ratchet cone on said other of the first and second opposed sides of the sprocket wheel;

forward pawls adapted to engage with said ratchet cone so as to lock up said ratchet cone;

a bearing collar pawl adapted to engage with the bearing collar so as to lock up the bearing collar;

a central gear disposed within the outer ring and bearing collar, such that both the outer ring and bearing collar encircle the central gear; and at least two planet pinions disposed between the outer ring and the central gear.

17. A two-way-driven 2-speed free wheel according to claim 16, further comprising spindles mounted on each of the first and second opposed sides of the sprocket wheel, and wherein backward pawls and forward pawls are respectively hinged on the spindles.

18. A two-way-driven 2-speed free wheel according to claim 17, wherein the outer ring has a ratchet gullet to be engaged with the backward pawls so as to lock up the outer ring, and the ratchet cone has ratchet teeth to be engaged with the forward pawls so as to lock up the ratchet cone.

* * * * *